(12) United States Patent
Liu et al.

(10) Patent No.: US 7,328,118 B2
(45) Date of Patent: Feb. 5, 2008

(54) METHOD OF DETERMINING THE MASS UNBALANCE OF AN ACTUATOR

(75) Inventors: Xiong Liu, Singapore (SG); ChoonKiat Lim, Singapore (SG); Kong Beng Terang Thia, Singapore (SG); Pow-Hing Yong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 734 days.

(21) Appl. No.: 10/731,806

(22) Filed: Dec. 9, 2003

(65) Prior Publication Data

US 2005/0125194 A1    Jun. 9, 2005

(51) Int. Cl.
*G01D 1/00* (2006.01)
(52) U.S. Cl. .................................................. 702/127
(58) Field of Classification Search ................ 702/127; 360/75
See application file for complete search history.

(56) References Cited

U.S. PATENT DOCUMENTS

| | | | |
|---|---|---|---|
| 4,214,481 A | 7/1980 | Reutlinger | 73/462 |
| 4,262,536 A | 4/1981 | Orem et al. | 73/462 |
| 4,310,892 A | 1/1982 | Himmler | 364/508 |
| 5,267,110 A | 11/1993 | Ottesen et al. | 360/106 |
| 5,319,509 A | 6/1994 | Michelson et al. | 360/77.03 |
| 5,404,636 A | 4/1995 | Stefansky et al. | 29/603 |
| 5,444,583 A | 8/1995 | Ehrlich et al. | 360/78.09 |
| 5,835,302 A | 11/1998 | Funches et al. | 360/78.07 |
| 5,854,721 A | 12/1998 | Lim | 360/106 |
| 5,867,348 A | 2/1999 | Suwa | 360/106 |
| 6,225,799 B1 | 5/2001 | Gergel et al. | 324/212 |
| 6,324,890 B1 | 12/2001 | Yeo et al. | 73/9 |
| 6,344,942 B1 | 2/2002 | Yarmchuk | 360/75 |
| 6,453,722 B1 | 9/2002 | Liu et al. | 73/9 |
| 6,563,661 B2 | 5/2003 | Thia et al. | 360/75 |
| 2001/0038508 A1* | 11/2001 | Thia et al. | 360/75 |

* cited by examiner

*Primary Examiner*—John Barlow
*Assistant Examiner*—Xiuqin Sun
(74) *Attorney, Agent, or Firm*—Leanne Taveggia Farrell; Westman, Champlin & Kelly, P.A.

(57) ABSTRACT

The present invention is a method of determining mass unbalance of an actuator mechanism in a system. The method includes calculating a center of gravity in first x and y components with respect to a first coordinate system of the actuator mechanism. The method also includes calculating the center of gravity in second x and y components with respect to a second coordinate system of the actuator mechanism. The total mass unbalance of the actuator mechanism is then calculated.

17 Claims, 9 Drawing Sheets

METHOD OF DETERMINING THE MASS UNBALANCE OF AN ACTUATOR

FIELD OF THE INVENTION

The present invention relates generally to actuators, and more particularly but not by limitation to calculating the mass unbalance of an actuator mechanism.

BACKGROUND OF THE INVENTION

Disc drives are common data storage devices. A typical disc drive includes a rigid housing that encloses a variety of disc drive components. The components include one or more discs having data surfaces that are coated with a medium for storage of digital information in a plurality of circular, concentric data tracks. The discs are mounted on a spindle motor that causes the discs to spin and the data surfaces of the discs to pass under respective hydrodynamic or aerodynamic bearing disc head sliders. The sliders carry transducers, which write information to and read information from the data surfaces of the discs.

An actuator mechanism moves the sliders across the data surfaces of the discs. The actuator mechanism includes a motor, such as a voice coil motor (VCM), a track accessing arm and suspensions that support the sliders. Under the control of electronic circuitry, the motor is operated so as to move the actuator mechanism about an actuator pivot center such that the sliders move from track-to-track across the data surface of a disc.

The center of gravity of the actuator is designed to coincide with the rotation axis of the actuator pivot center. However, each part of the actuator, such as the VCM, the track-accessing arm and suspensions, are designed and manufactured separately. Error in manufacturing and assembly of the actuator causes the center of gravity of the actuator to not align with the actuator pivot center. This misalignment is the mass unbalance of the actuator and is determined by multiplying the mass of the actuator by the distance of the actuator center of gravity to the actuator pivot center.

The ability to determine the distance of the actuator center of gravity to the actuator pivot center is crucial for actuator design as well as to ensure disc drive reliability. An actuator having a mass unbalance is especially sensitive to external linear vibrations and shock excitations. In addition, controlling the -mass unbalance in disc drives with high track densities is very important. However, the distance between the center of gravity of the actuator and the actuator pivot center in high track density systems is too low to measure by traditional mechanical methods.

SUMMARY OF THE INVENTION

The present invention is a method of determining mass unbalance of an actuator mechanism in a system. The method includes calculating a center of gravity in first x and y components with respect to a first coordinate system of the actuator mechanism. The method also includes calculating the center of gravity in second x and y components with respect to a second coordinate system of the actuator mechanism. The total mass unbalance of the actuator mechanism is then calculated.

The present invention also includes an apparatus for determining the mass unbalance of an actuator mechanism in a system. The apparatus includes a voice coil motor configured to rotate the actuator mechanism about a pivot shaft. The actuator mechanism draws a current from the voice coil motor. The apparatus also includes processing circuitry coupled to the voice coil motor to obtain the current drawn by the actuator mechanism and to calculate the mass unbalance of the actuator mechanism.

Other features and benefits that characterize embodiments of the present invention will be apparent upon reading the following detailed description and review of the associated drawings.

BRIEF DESCRIPTION OF THE DRAWINGS

FIG. 6-1 is a top plan view of a disc drive oriented in a first orientation in accordance with the present invention.

FIG. 6-2 is a top plan view of a disc drive oriented in a second orientation in accordance with the present invention.

FIG. 7-1 is a top plan view of a disc drive oriented in a third orientation in accordance with the present invention.

FIG. 7-2 is a top plan view of a disc drive oriented in a fourth orientation in accordance with the present invention.

FIG. 8 is a block diagram of an apparatus for calculating the mass unbalance of the actuator mechanism in accordance with an embodiment of the present invention.

DETAILED DESCRIPTION OF ILLUSTRATIVE EMBODIMENTS

Figure 1:
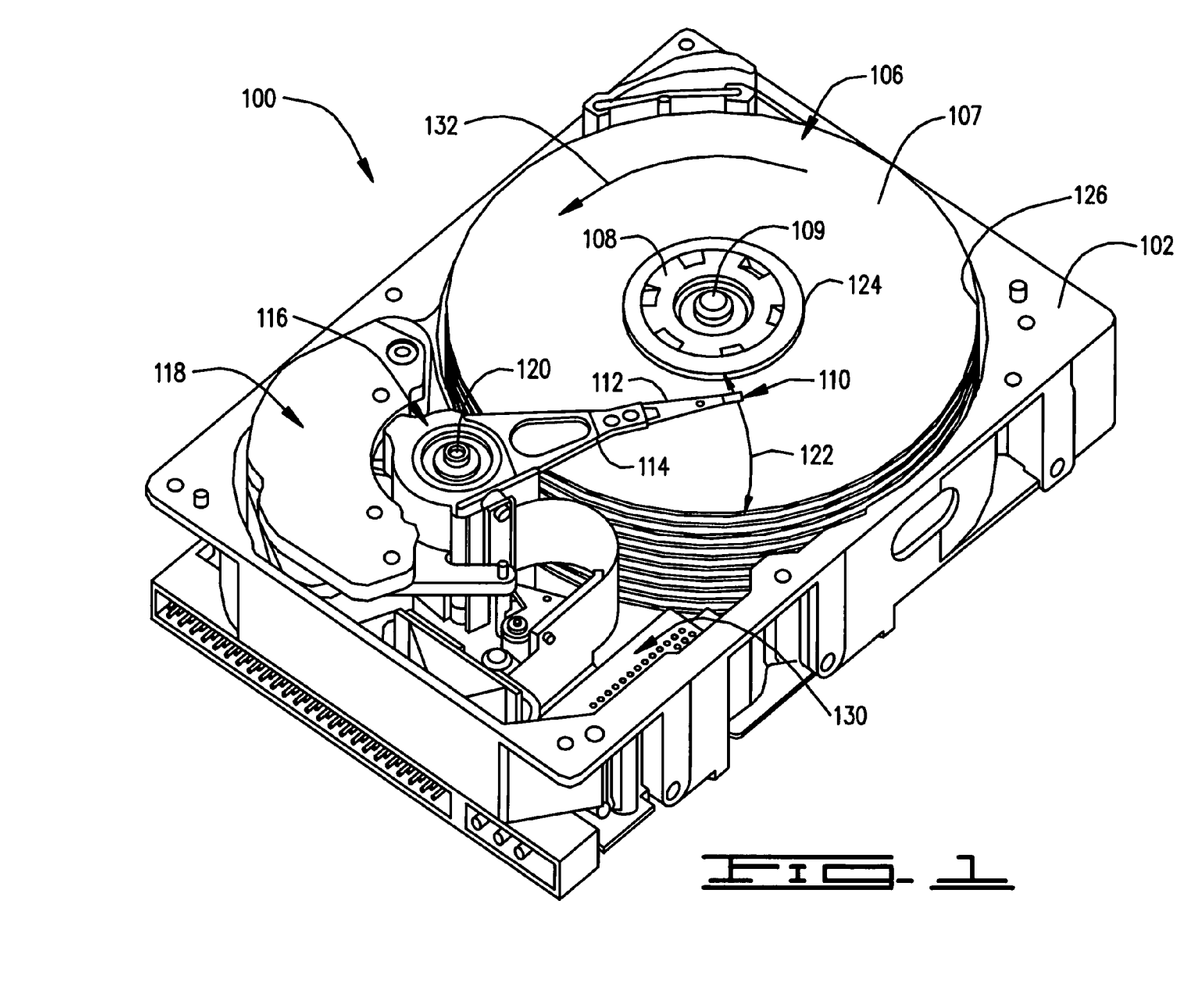
FIG. 1 is a perspective view of a disc drive.

FIG. 1 is a perspective view of disc drive 100 that includes a housing with a base deck 102 and top cover (not shown). Disc drive 100 further includes a disc pack 106, which is mounted on a spindle motor (not shown in FIG. 1) by a disc clamp 108. Disc pack 106 can include one or more discs and is illustrated with a plurality of individual discs 107, which are mounted for co-rotation about central axis 109 in a direction indicated by arrow 132. Each disc surface has an associated slider 110, which carries a read/write head for communication with the disc surface. In the example in FIG. 1, sliders 110 are supported by suspension 112 which is in turn attached to track accessing arm 114 of an actuator mechanism 116. Actuator mechanism 116 is of the type known as a rotary moving coil actuator and includes a voice coil motor (VCM), shown generally at 118. VCM 118 rotates actuator 116 about pivot shaft 120 to position sliders 110 over a desired data track along an arcuate path 122 between a disc inner diameter 124 and a disc outer diameter 126. VCM 118 is driven by electronic circuitry 130 based on signals generated by the read/write heads and a host computer (not shown).

The center of gravity of actuator mechanism 116 is configured to coincide with the rotation axis of the actuator pivot shaft 120. However, each part of actuator mechanism 116, such as VCM 118, track accessing arm 114 and suspension 112, are designed and manufactured separately.

Error in manufacturing and assembly of actuator mechanism 116 causes the center of gravity of actuator mechanism 116 to not align with the pivot shaft 120. This misalignment is the mass unbalance of actuator mechanism 116 and is determined by multiplying the mass of actuator mechanism 116 by the distance from the center of gravity of actuator mechanism 116 to the pivot shaft 120.

Determining the distance from the center of gravity of the actuator mechanism 116 to pivot shaft 120 is crucial for designing the actuator mechanism as well as ensuring that disc drive 100 is reliable. If actuator mechanism 116 has a mass unbalance, then actuator mechanism 116 is especially sensitive to external linear vibrations and shock excitations. In addition, controlling the mass unbalance in high track density storage devices, such as disc drive 100, is very important.

Figure 2:
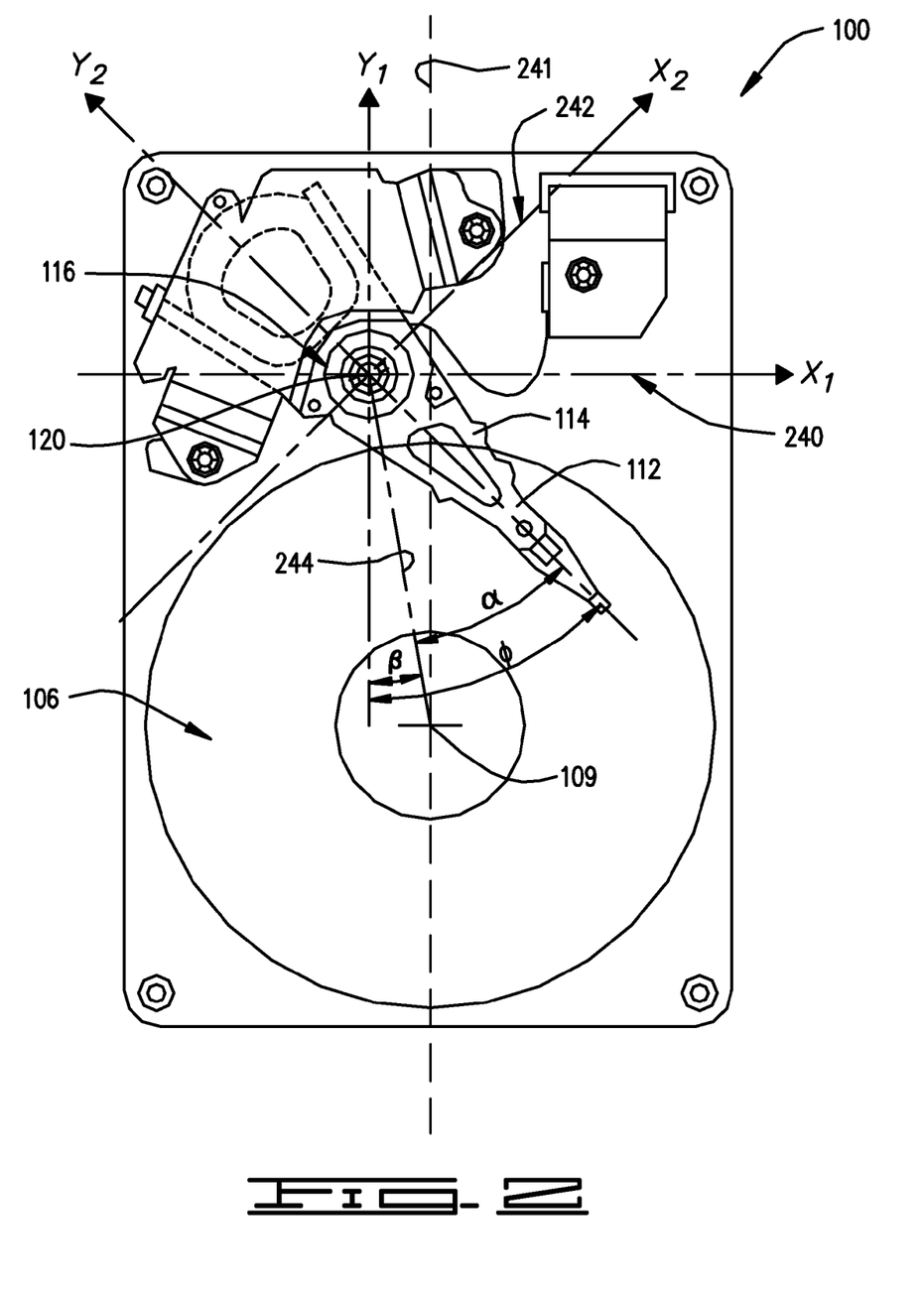
FIG. 2 is a top plan view of the disc drive illustrating first and second coordinate systems in accordance with the present invention.

The distance between the center of gravity of actuator mechanism 116 and pivot shaft 120 in high track density systems is too low to measure by traditional mechanical methods. Thus, the present invention is a method for calculating the mass unbalance of the system when the actuator mechanism 116 is assembled into disc drive 100 (at drive level) using a system of equations. The present invention can be utilized in both high track density systems as well as low track density systems. FIG. 2 illustrates first coordinate system 240 and second coordinate system 242 used in calculating the mass unbalance of actuator mechanism 116 of disc drive 100. First coordinate system 240 has first x-axis $X_1$ and first y-axis $Y_1$. First coordinate system 240 is fixed. However, the location of the center of gravity changes in first coordinate system 240 according to the particular track actuator 116 locates slider 110. Thus, second coordinate system 242, which is constant relative to the position of the actuator mechanism, is introduced because the location of center of gravity in second coordinate system 242 is constant. Second coordinate system 242 has second x-axis $X_2$ and second y-axis $Y_2$. First y-axis $Y_1$ intersects pivot shaft 120 of actuator mechanism 116 and is parallel to a longitudinal axis 241 of disc drive 100. First x-axis $X_1$ intersects pivot shaft 120 and is normal to first y-axis $Y_1$. Second y-axis $Y_2$ intersects pivot shaft 120 of actuator mechanism 116 and is parallel to a longitudinal axis of track accessing arm 114. Second x-axis $X_2$ intersects pivot shaft 120 is normal to second y-axis $Y_2$.

Figure 3:
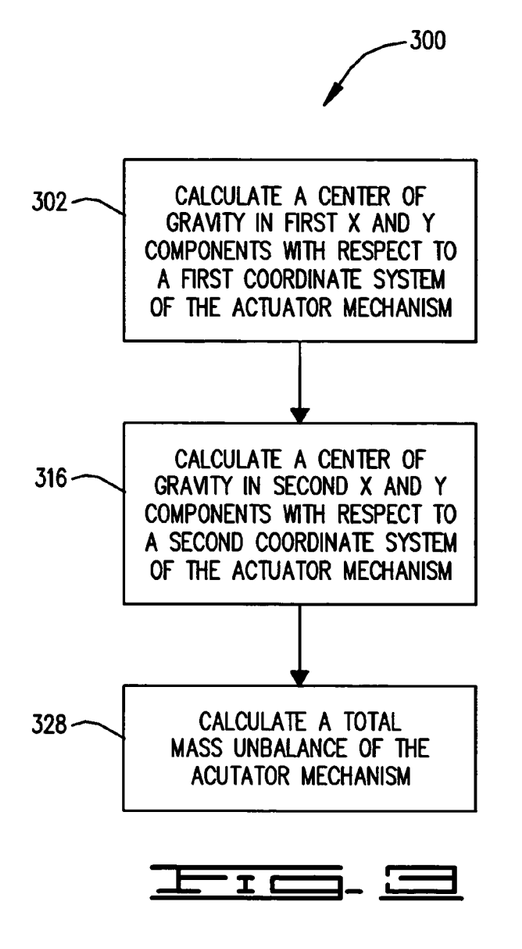
FIG. 3 is a flowchart of a method of determining mass unbalance of the actuator mechanism in accordance with an embodiment of the present invention.

FIG. 3 is a flow chart 300 of a method of determining mass unbalance of actuator mechanism 116 in disc drive 100 (see FIGS. 1 and 2). In step 302, a center of gravity in first x and y components ($C_{X1}$, $C_{Y1}$) with respect to first coordinate system 240 (illustrated in FIG. 2) of actuator mechanism 116 is calculated. The first x component $C_{X1}$ is the distance from pivot shaft 120 to the center of gravity in the first x-axis $X_1$. The first y component $C_{Y1}$ is the distance from pivot shaft 120 to the center of gravity in the first y-axis $Y_1$. In step 316, a center of gravity in second x and y components with respect to second coordinate system 242 (illustrated in FIG. 2) of actuator mechanism 116 is calculated. The second x component $C_{X2}$ is the distance from pivot shaft 120 to the center of gravity in the second x-axis $X_2$. The second y component $C_{Y2}$ is the distance from pivot shaft 120 to the center of gravity in the second y-axis $Y_2$. In step 328, a total mass unbalance of actuator mechanism 116 is calculated. Steps 302, 316 and 328 will be thoroughly described below.

Figure 4:
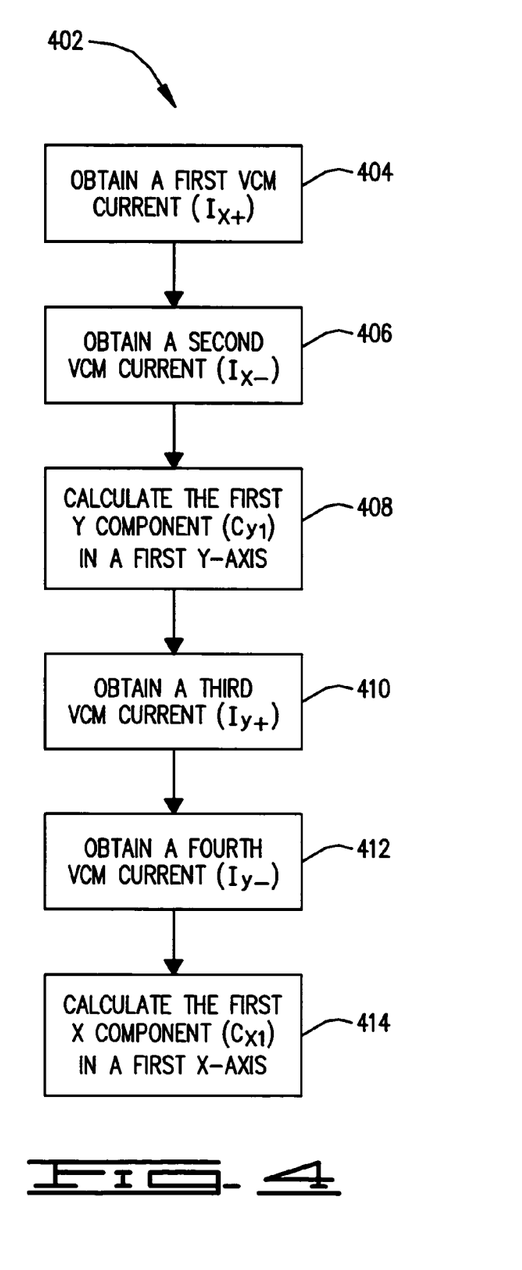
FIG. 4 is a flowchart of a method of calculating a first center of gravity in first x and y components with respect to a first coordinate system of the actuator mechanism in accordance with an embodiment of the present invention.

Step 302 of flowchart 300 can be the plurality of steps illustrated in flowchart 402 of FIG. 4. Flowchart 402 further describes the step of calculating a first center of gravity in first x and y components with respect to first coordinate system 240 of actuator mechanism 116 in FIG. 2. Disc drive 100, configured in the track following mode, is placed in a first orientation 600-1, designated as the positive x-orientation as shown in FIG. 6-1, which is a top plan view of disc drive 100. This positive x-orientation causes the actuator mechanism 116 to a draw a first VCM current $I_{x+}$ to keep slider 110 in the same track. In step 404, first VCM current $I_{x+}$ is obtained. Disc drive 100 is then placed in a second orientation 600-2, designated as the negative x-orientation as shown in FIG. 6-2, which is a top plan view of disc drive 100. This negative x-orientation causes the actuator mechanism 116 to draw a second VCM current $I_{x-}$ to keep slider 110 in the same track. In step 406, second VCM current $I_{x-}$ is obtained. First orientation 600-1 illustrates actuator mechanism 116 in the lower left corner of disc drive 100. Second orientation 600-2 illustrates actuator mechanism 116 located in the upper left corner of disc drive 100. To position disc drive 100 from orientation 600-1 to orientation 600-2, disc drive 100 is flipped about its bottom side edge to the negative x-orientation. However, it should be noted that in the alternative, disc drive 100 can be rotated 180° to negative x-orientation 600-2 such that actuator mechanism is located in the top right corner instead of the top left corner. Disc drive 100 can be oriented from orientation 600-1 to orientation 600-2 in a multitude of ways, as long as actuator mechanism 116 is located at the bottom of disc drive 100 in FIG. 6-1 and located at the top of disc drive 100 in FIG. 6-2.

In step 408 of flowchart 402, first y component $C_{Y1}$ is calculated in first y-axis $Y_1$ (see FIG. 2). The first y component $C_{Y1}$ is calculated with the following equation:

$$C_{Y1} = ((I_{x+} - I_{x-})/2) \times (K_t/mg) \qquad \text{Equation 1}$$

where $I_{x+}$ is the first VCM current drawn by actuator mechanism 116, $I_{x-}$ is the second VCM current drawn by actuator mechanism 116, $K_t$ is the torque constant of VCM 118, m is the mass of actuator mechanism 116 and g is the gravity constant. Those skilled in the art should recognize that mass m can be measured with traditional methods.

Figure 71:
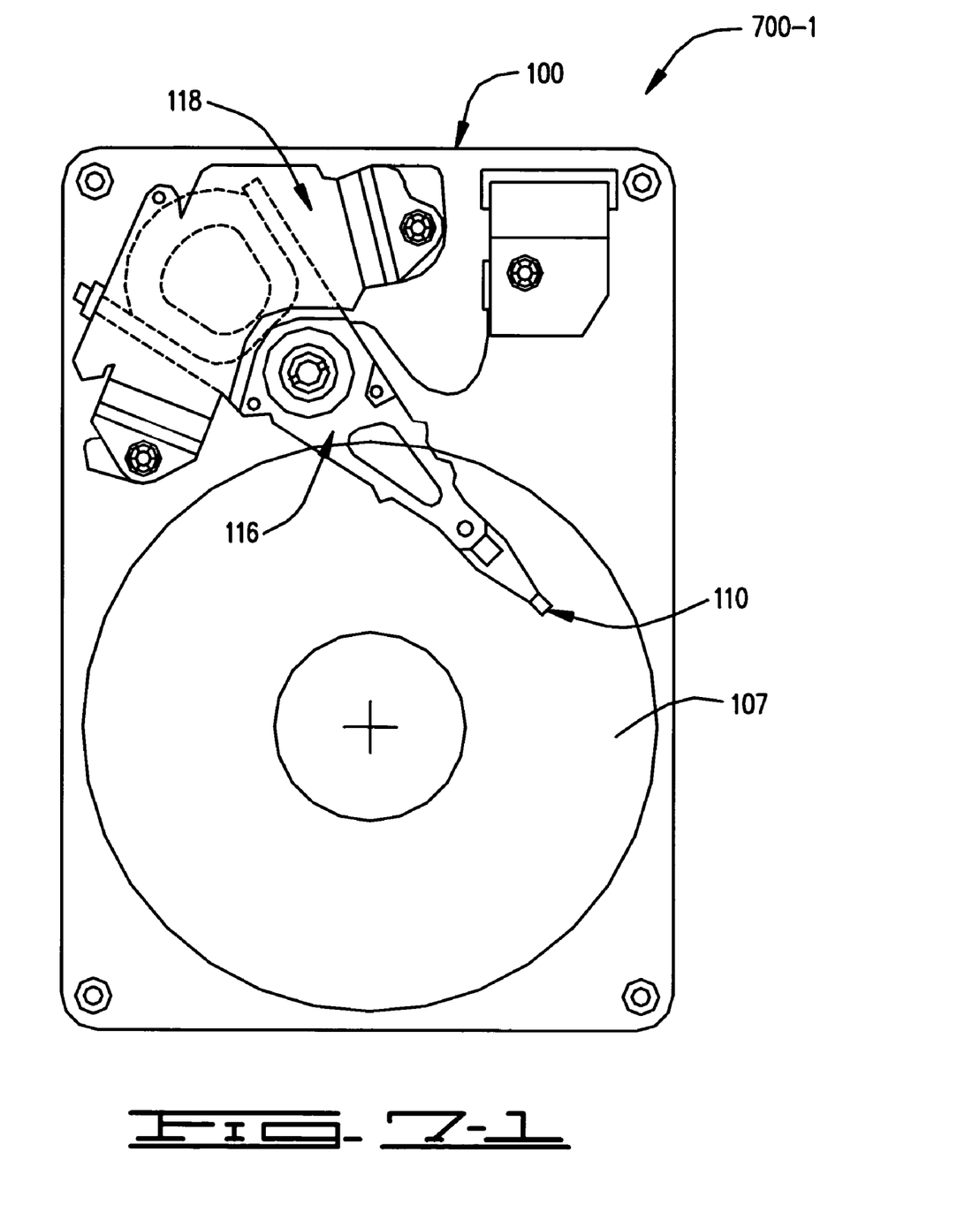
Figure 72:
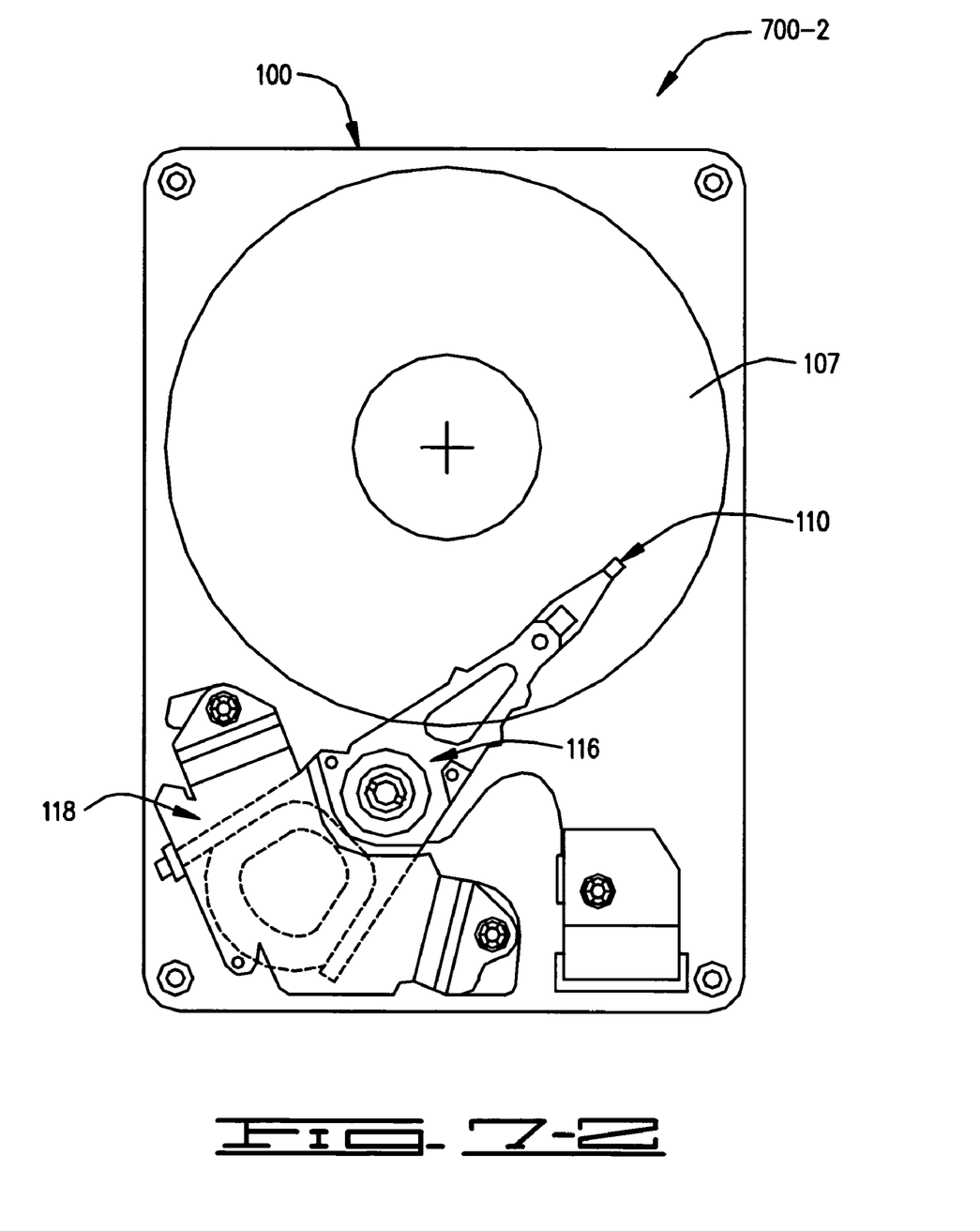

Next, disc drive 100, configured in the track following mode, is placed in a third orientation 700-1, designated as the positive y-orientation as shown in FIG. 7-1, which is a top plan view of disc drive 100. This positive y-orientation causes the actuator mechanism 116 to a draw a third VCM current $I_{y+}$ to keep slider 110 in the same track. In step 410, first VCM current $I_{y+}$ is obtained. Disc drive 100 is then placed in a fourth orientation 700-2, designated as the negative y-orientation as shown in FIG. 7-2, which is a top plan view of disc drive 100. This negative y-orientation causes the actuator mechanism 116 to draw a fourth VCM current $I_{y-}$ to keep slider 110 in the same track. In step 412, fourth VCM current $I_{y-}$ is obtained. Third orientation 700-1 illustrates actuator mechanism 116 in the upper left corner of disc drive 100. Fourth orientation 700-2 illustrates actuator mechanism 116 located in the lower left corner of disc drive 100. To position disc drive 100 from orientation 700-1 to orientation 700-2, disc drive 100 is flipped about its bottom side edge to the negative y-orientation. However, it should be noted that in the alternative, disc drive 100 can be rotated 180° to negative y-orientation 700-2 such that actuator mechanism is located in the bottom right corner instead of the top left corner. Disc drive 100 can be oriented from orientation 700-1 to orientation 700-2 in a multitude of ways, as long as actuator mechanism 116 is located at the top of FIG. 7-1 and located at the bottom of FIG. 7-2.

In step 414 of flowchart 402, first x component $C_{X1}$ is calculated in first x-axis $X_1$ (see FIG. 2). The first x component $C_{X1}$ is calculated with the following equation:

$$C_{X1}=((I_{y-}-I_{y+})/2)\times(K_t/mg) \quad \text{Equation 2}$$

where $I_{y+}$ is the third VCM current drawn by actuator mechanism 116, $I_{y-}$ is the fourth VCM current drawn by actuator mechanism 116, $K_t$ is the torque constant of VCM 118, m is the mass of actuator mechanism 116 and g is the gravity constant.

Figure 5:
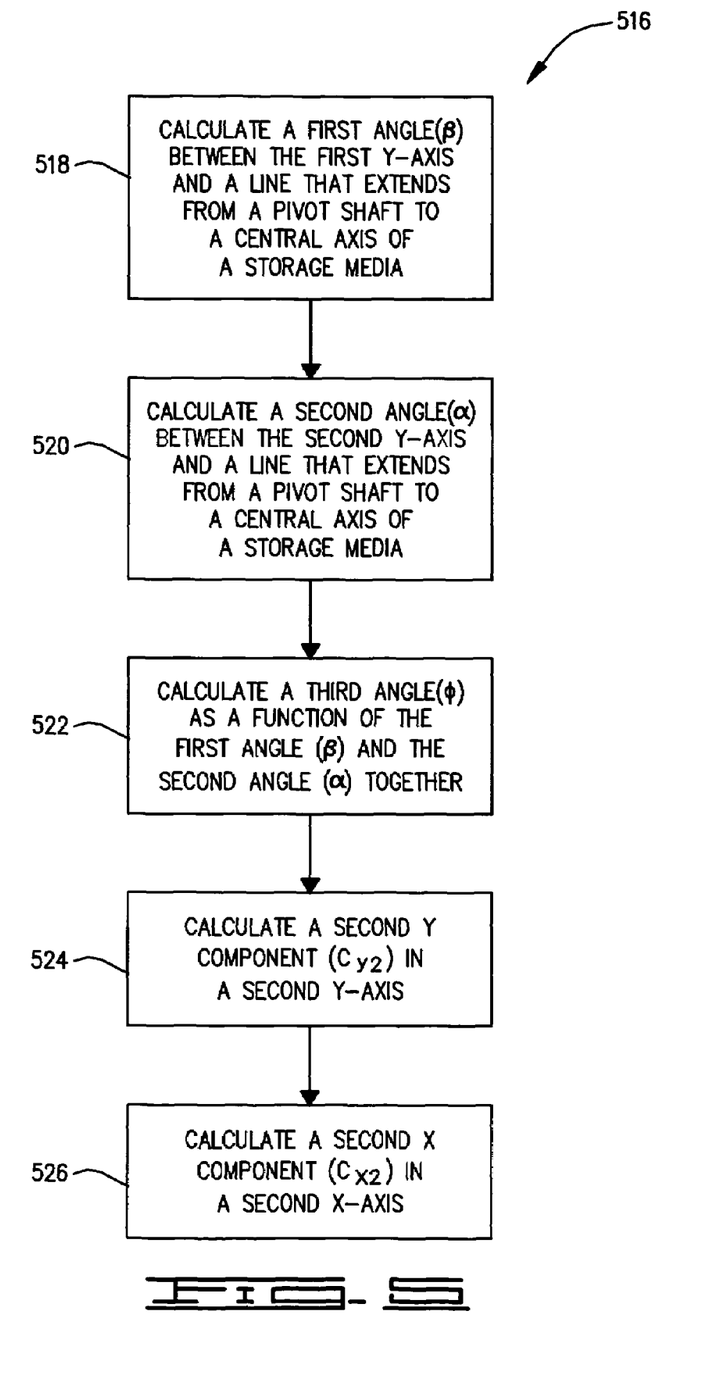
FIG. 5 is a flowchart of a method of calculating a second center of gravity in second x and y components with respect to a second coordinate system of the actuator mechanism in accordance with an embodiment of the present invention.
Figure 9:
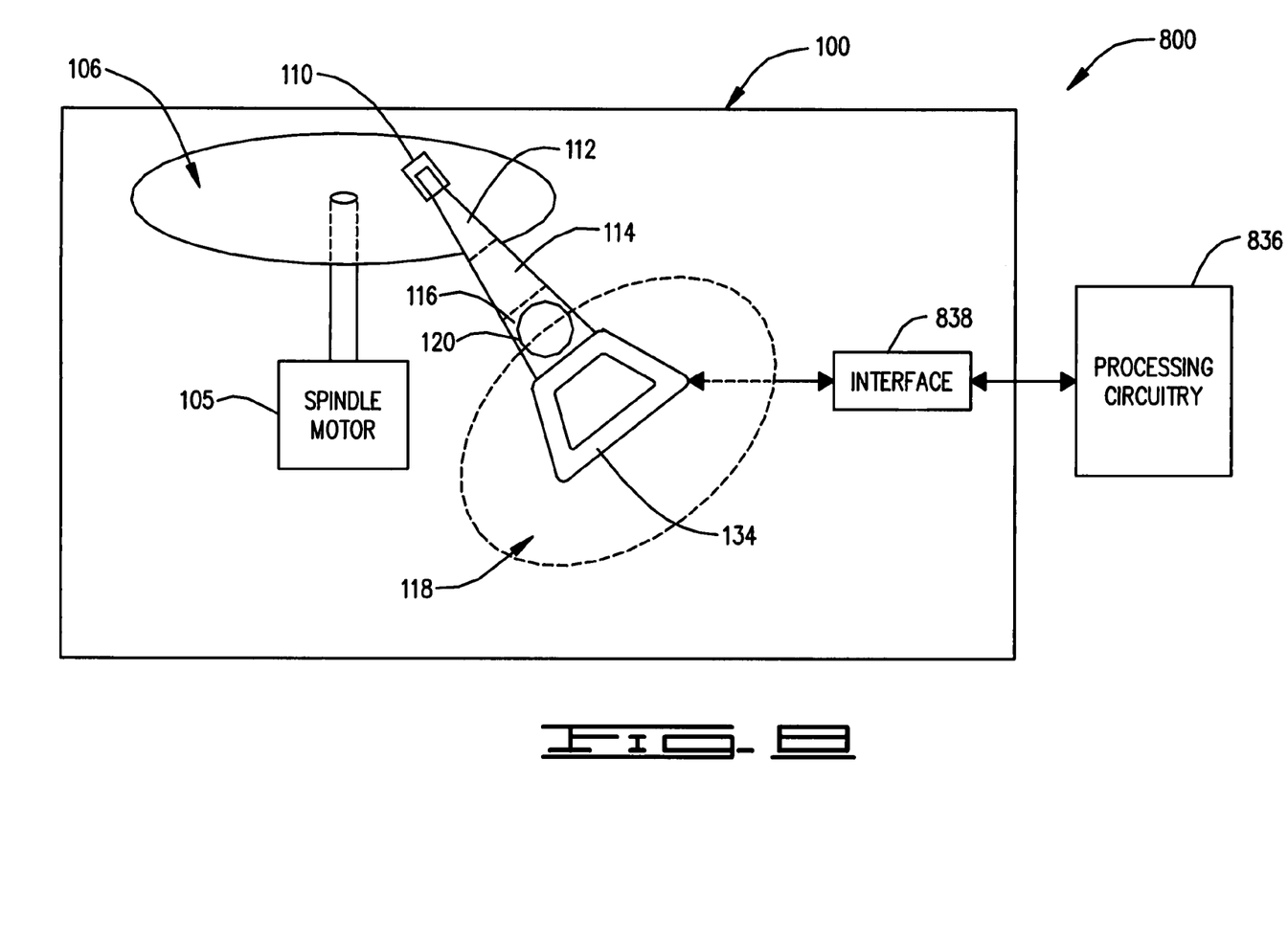
Figure 61:
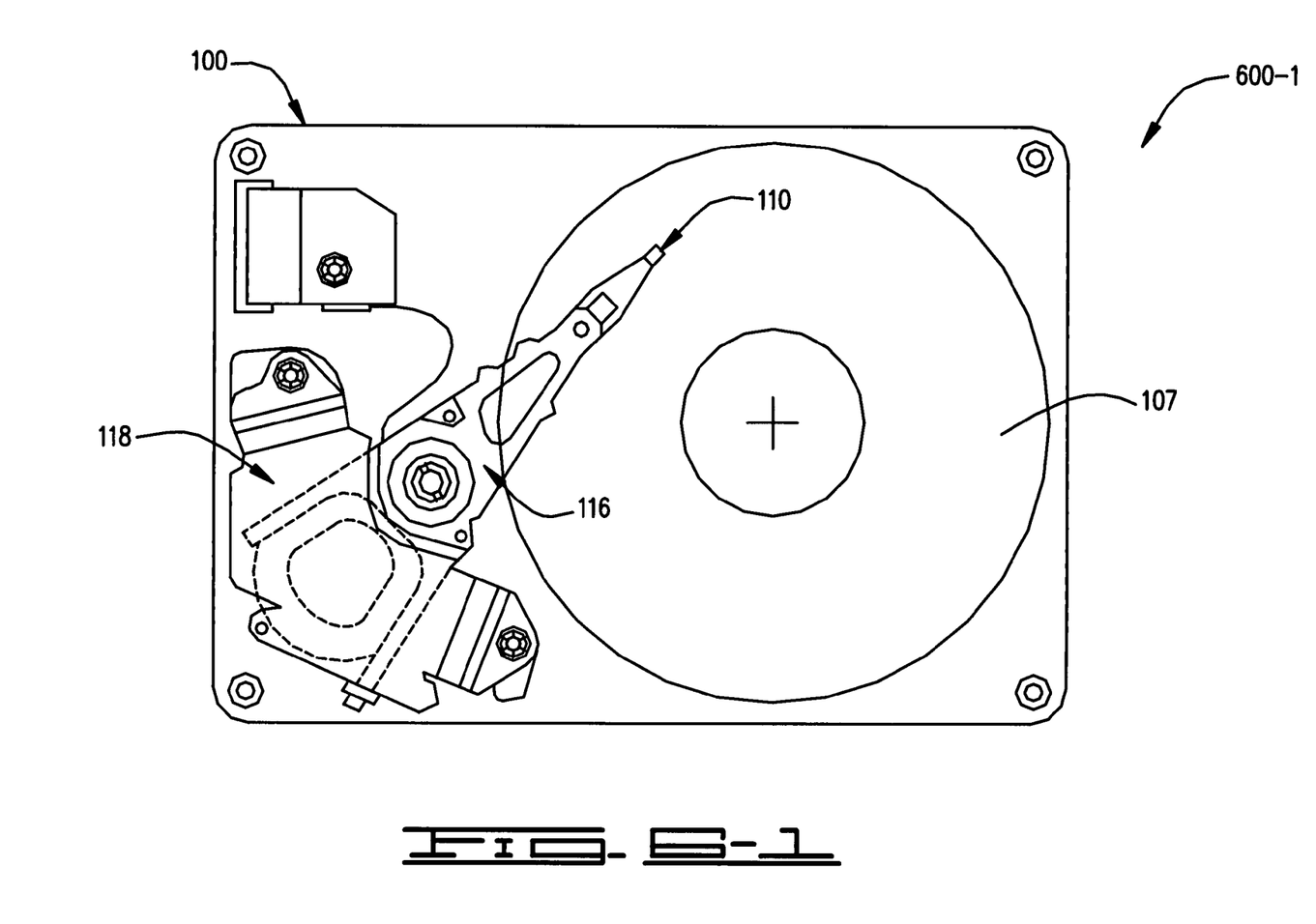
Figure 62:
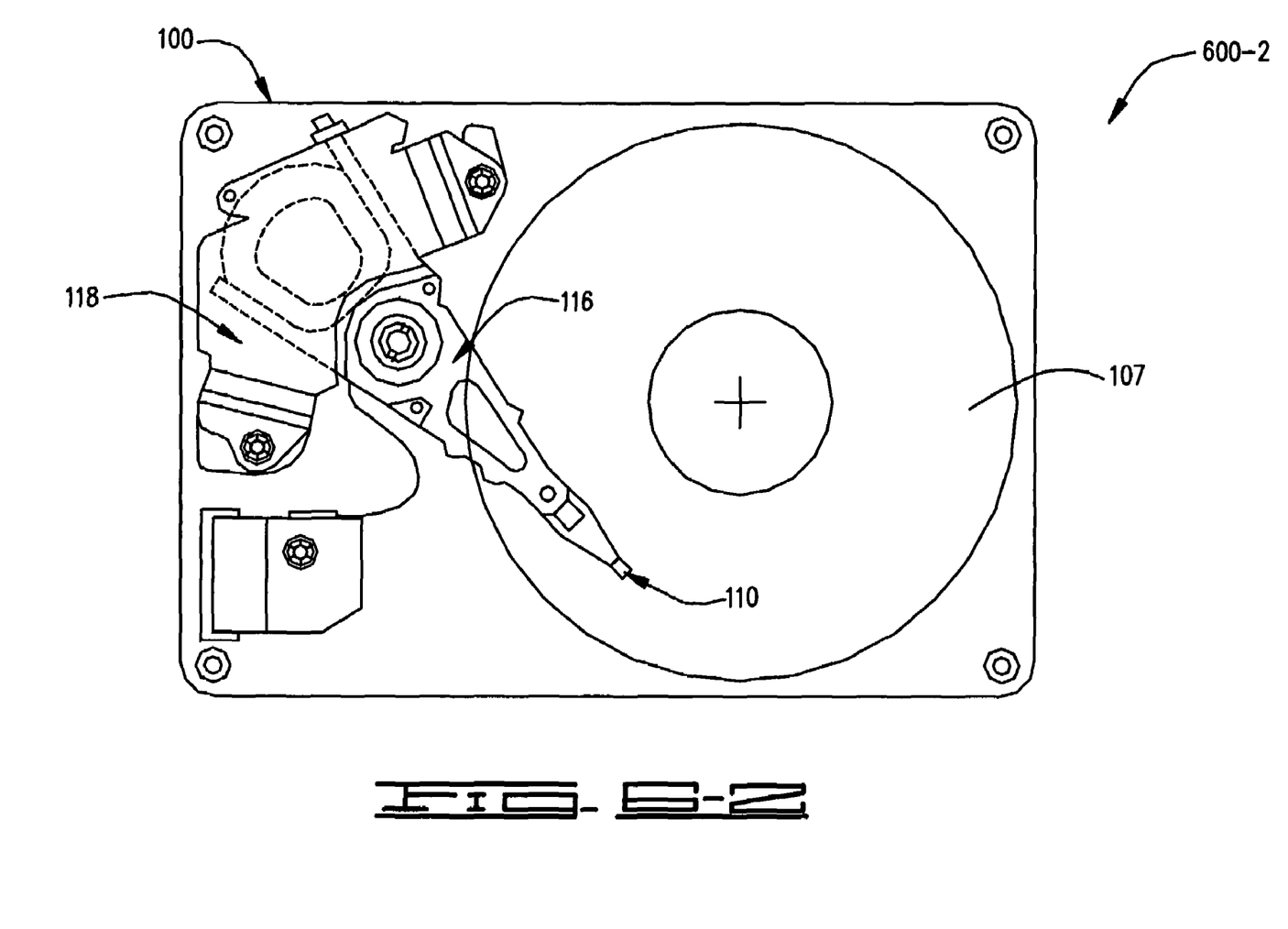

Step 316 of flowchart 300 can be the plurality of steps illustrated in flowchart 516 of FIG. 5. Flowchart 516 further describes the step of calculating the center of gravity in second x and y components with respect to second coordinate system 242 of actuator mechanism 116 in FIG. 2. In step 518, first angle β extending between first y-axis $Y_1$ and line 244 is calculated. Line 244 extends from pivot shaft 120 to central axis 109 of disc pack 106. First angle β is calculated with the following equation:

$$\beta=\tan^{-1}(sqrt(pc^2-pcy^2)/|pcy|) \quad \text{Equation 3}$$

where pc is the distance from pivot shaft 120 to central axis 109 of disc pack 106 and pcy is the distance from pivot shaft 120 to central axis 109 of disc pack 106 in first y-axis $Y_1$. Those skilled in the art should recognize that distances pc and pcy can be measured using traditional methods.

In step 520, second angle α extending between second y-axis $Y_2$ and line 244 is calculated. Second angle α is calculated with the following equation:

$$\alpha=\cos^{-1}((pc^2+pg^2-rn^2)/(2\times pc\times pg)) \quad \text{Equation 4}$$

where pc is the distance from pivot shaft 120 to central axis 109 of disc pack 106, pg is the distance from pivot shaft 120 to the writer-reader gap and rn is the radius at the measuring track. Those skilled in the art should recognize that distances pc, pg and rn can be measured using traditional methods.

In step 522, third angle φ extending between first y-axis Y1 and second y-axis Y2 is calculated. The third angle φ is calculated as a function of first angle β and second angle α. For example, third angle φ can be calculated by adding first angle β and second angle α together. This example equation is represented by:

$$\phi=\beta+\alpha \quad \text{Equation 5}$$

where β is the first angle and α is the second angle.

In step 524, second Y component $C_{Y2}$ is calculated in second y-axis $Y_2$. The second y component $C_{Y2}$ is calculated with the following equation:

$$C_{Y2}=-C_{X1}\sin(\phi)+C_{Y1}\cos(\phi) \quad \text{Equation 6}$$

where $C_{X1}$ is the first x component as calculated in step 414 of flowchart 402, $C_{Y1}$ is the first y component as calculated in step 408 of flowchart 402 and φ is the third angle as calculated above.

In step 526, second x component $C_{X2}$ is calculated in second x-axis $X_2$. The second x component $C_{X2}$ is calculated with the following equation:

$$C_{X2}=C_{X1}\cos(\phi)+C_{Y1}\sin(\phi) \quad \text{Equation 7}$$

where $C_{X1}$ is the first x component as calculated in step 414 of flowchart 402, $C_{Y1}$ is the first y component as calculated in step 408 of flowchart 402 and φ is the third angle as calculated above.

Step 328 is the last step of the method shown in flowchart 300. In step 328, a total mass unbalance of actuator mechanism 116 is calculated. In order to calculate the total mass unbalance of actuator mechanism 116, the center of gravity must first be calculated. This equation is represented by:

$$CG=sqrt(C_{X2}^2+C_{Y2}^2) \quad \text{Equation 8}$$

where CG is the center of gravity of actuator mechanism 116, $C_{X2}$ is the second x component in second x-axis $X_2$ as calculated in step 526 of flowchart 516 and $C_{Y2}$ is the second y component in the second y-axis $Y_2$ as calculated in step 524 of flowchart 516.

Lastly, the mass unbalance of the actuator mechanism 116 can be determined with the following equation:

$$\text{Total Mass Unbalance}=m\times CG \quad \text{Equation 9}$$

where CG is the center of gravity of actuator mechanism 116 as calculated in Equation 8 and m is the mass of actuator mechanism 116.

In one example of the present invention, the mass unbalance of an actuator in a disc drive is determined by following the steps in flowchart 300, flowchart 402 and flowchart 516. The torque constant $K_t$ for the disc drive used is 0.019 Newton-meter per Ampere (N·m/A). The current resolution of the VCM is $5.18\times10^{-2}$ milliamperes per bit (mA/bit), such that in an alternative form the torque resolution is $9.84\times10^{-7}$ Newton-meter per bit (N·m/bit). Other parameters of the disc drive include: the distance pc from the pivot shaft to the center of the disc pack at 2.255 in.; the distance pcy from the pivot shaft to the center of the disc pack in the first y-axis is 2.199 in.; the distance pg from the pivot shaft to the writer-reader gap is 1.787 in. and the radius rn at the measuring track is 1.56 in. The mass m of the actuator is 6.5 g.

Beginning with step 302 of flowchart 300 and the plurality of steps in flowchart 402, the center of gravity in first x and y components with respect to a first coordinate system of the actuator is calculated. In step 404, first VCM current $I_{x+}$ is obtained after placing the disc drive in the positive x-orientation as shown in FIG. 6-1. Since the current is being measured at drive level, the current collected is represented in count. The average value of the current obtained in this orientation is 486.2 counts. This value has a partial count because it is an average value. Those skilled in the art will recognize that counts do not exist in single collection. However, in order to improve accuracy in calculating the current in amperes, the decimal of the count value is retained. In terms of amperes, the current is 25.19 milliamperes. In step 406, second VCM current $I_{x-}$ is obtained after placing the disc drive in the negative x-orientation as shown in FIG. 6-2. The average value of the current obtained in this orientation is 498.2 counts. In terms of amperes, the current is 25.81 milliamperes. In step 408 and using Equation 1 as illustrated above, the center of gravity in the first y component $C_{Y1}$ with respect to the first y-axis $Y_1$ is calculated. In step 410, third VCM current $I_{y+}$ is obtained after placing the disc drive in the positive y-orientation as shown in FIG. 7-1. The average value of the current obtained in this orientation is 485.0 counts. In terms of amperes, the current is 25.12 milliamperes. In step 412, fourth VCM current $I_{y-}$ is obtained after placing the disc drive in the negative y-orientation as shown in FIG. 7-2. The average value of the current obtained in this orientation is 513.4 counts. In terms of amperes, the current is 26.59 milliamperes. In step 414 and using Equation 1 as illustrated above, the center of gravity in the first x component $C_{X1}$ with respect to the first x-axis $X_1$ is calculated.

In step 316 of flowchart 300 and the plurality of steps in flowchart 516, the center of gravity in second x and y components with respect to a second coordinate system of the actuator is calculated. In step 518, first angle β is calculated using Equation 3 as illustrated above. Using the values obtained and calculated above, first angle β is 12.8 degrees. In step 520, second angle α is calculated using Equation 4 as illustrated above. Using the values obtained and calculated above, second angle α is 42.8 degrees. In step 522, third angle φ is calculated using Equation 5 as illustrated above. Third angle φ is 55.6 degrees. In step 524 and using Equation 6 as illustrated above, the center of gravity in the second y component $C_{Y2}$ with respect to the second y-axis $Y_2$ is calculated. This value is −0.23 mm. In step 526 and using Equation 7 as illustrated above, the center of gravity in the second x component $C_{X2}$ with respect to the second x-axis $X_2$ is calculated. This value is 0.05 mm.

In step 328 of flowchart 300, the total mass unbalance of the actuator is calculated. Using Equation 8 as illustrated above, the center of gravity CG of the actuator is determined. Using Equation 9 as illustrated above, the mass m and the center of gravity CG are multiplied together. The total mass unbalance is 1.55 gmm.

FIG. 8 is a block diagram of apparatus 800 for calculating the mass unbalance of actuator mechanism 116 in accordance with an embodiment of the present invention. Apparatus 800 includes disc drive 100. Disc drive 100 includes a housing having disc pack 106, which is mounted on spindle motor 105. Each disc surface in disc pack 106 has a slider 110 supported by suspension 112 which is in turn attached to track accessing arm 114 of actuator mechanism 116. Actuator mechanism 116 includes VCM 118, which rotates actuator 116 about pivot shaft 120. VCM 118 includes VCM coils 134.

Apparatus 800 also includes processing circuitry 836. Processing circuitry 836 is coupled to VCM 118 through an interface 838. Interface 838 can be, for example, a serial port. Those skilled in the art should recognize this is not an exhaustive list and other types of interfaces can be used. Processing circuitry 836 can be a host computer or other type of device, which can obtain the current drawn by VCM coil 134 in VCM 118. Processing circuitry also includes a software program that collects and uses the system of equations of the present invention for calculating the mass unbalance of actuator mechanism 116. For example, a software program, such as MATLAB created and sold by Mathworks, Inc. of Natick, Mass., can be used to calculate the mass unbalance of actuator mechanism 116.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular steps and elements may vary depending on the particular application, while maintaining substantially the same functionality without departing from the scope and spirit of the present invention.

What is claimed is:

1. A method of determining mass unbalance of an actuator mechanism in a system, the method comprising:
calculating a center of gravity of the actuator mechanism in first x ($C_{X1}$) and y ($C_{Y1}$) components of a first coordinate system, wherein the first coordinate system intersects a pivot shaft of the actuator mechanism and has a y-axis in parallel with a longitudinal axis of the system and an x-axis normal to the y-axis;
calculating the center of gravity in second x ($C_{X2}$) and y ($C_{Y2}$) components of a second coordinate system, wherein the second coordinate system intersects a pivot shaft of the actuator mechanism and has a y-axis in alignment with a longitudinal axis of a track accessing arm of the actuator mechanism and an x-axis normal to the y-axis; and
calculating a total mass unbalance of the actuator mechanism as a function of the first x ($C_{X1}$) and y ($C_{Y1}$) components and the second x ($C_{X2}$) and y ($C_{Y2}$) components.

2. The method of claim 1, wherein calculating the center of gravity of the actuator mechanism in the first y component of the first coordinate system comprises:
obtaining a first voice coil motor (VCM) current ($I_{x+}$) when the system is oriented in a first orientation; and
obtaining a second voice coil motor (VCM) current ($I_{x-}$) when the system is oriented in a second orientation.

3. The method of claim 2, wherein the first y component in the first coordinate system is calculated as a function of the first voice coil motor (VCM) current ($I_{x+}$), the second voice coil motor (VCM) current ($I_{x-}$), a torque constant ($K_t$) of the voice coil motor (VCM) and a mass (m) of the actuator mechanism.

4. The method of claim 1, wherein calculating the first x component in the first coordinate system comprises:
obtaining a third voice coil motor (VCM) current ($I_{y+}$) when the system is oriented in a third orientation; and
obtaining a fourth voice coil motor (VCM) current ($I_{y-}$) when the system is oriented in a fourth orientation.

5. The method of claim 4, wherein the first x component in the first coordinate system is calculated as a function of the third voice coil motor (VCM) current ($I_{y+}$), the fourth voice coil motor (VCM) current ($I_{y-}$), a torque constant ($K_t$) of the voice coil motor (VCM) and a mass (m) of the actuator mechanism.

6. The method of claim 1, wherein calculating the center of gravity of the actuator mechanism in the second x and y components of the second coordinate system further comprises:
calculating a first angle between the y-axis of the first coordinate system and a line that extends from the pivot shaft to a central axis of a storage media;
calculating a second angle between the y-axis of the second coordinate system and the line that extends from the pivot shaft to the central axis of the storage media; and
calculating a third angle as a function of the first angle and the second angle.

7. The method of claim 6, wherein the second x and y components in the second coordinate system of the center of gravity are calculated as a function of the first x and y components in the first coordinate system of the center of gravity and the third angle.

8. The method of claim 7 and further comprising calculating a total center of gravity of the actuator mechanism by taking the square root of the sum of the second x component squared and the second y component squared.

9. The method of claim 8, wherein the total mass unbalance of the actuator mechanism is calculated by multiplying the total center of gravity by the mass of the actuator mechanism.

10. A method of determining mass unbalance of an actuator mechanism, the method comprising:
- obtaining a current drawn by the actuator mechanism from a voice coil motor to calculate a center of gravity of the actuator mechanism in first x ($C_{X1}$) and y ($C_{Y1}$) components of a first coordinate system;
- calculating the center of gravity of the actuator mechanism in second x ($C_{X2}$) and y ($C_{Y2}$) components of a second coordinate system as a function of an angle ($\phi$) between a track accessing arm of the actuator mechanism and a y-axis of the first coordinate system;
- calculating the mass unbalance of the actuator mechanism as a function of the first x ($C_{X1}$) and y ($C_{Y1}$) components of the first coordinate system and the second x ($C_{X2}$) and y ($C_{Y2}$) components of the second coordinate system.

11. The method of claim 10, wherein obtaining the current drawn by the actuator mechanism from the voice coil motor to calculate the center of gravity of the actuator mechanism in the first y component of the first coordinate system comprises:
- obtaining a first VCM current ($I_{x+}$) when the actuator mechanism is oriented in a first orientation;
- obtaining a second VCM current ($I_{x-}$) when the actuator mechanism is oriented in a second orientation; and
- calculating the first y component of the first coordinate system as a function of the first VCM current ($I_{x+}$) and the second VCM current ($I_{x-}$).

12. The method of claim 10, wherein obtaining the current drawn by the actuator mechanism from the voice coil motor to calculate the center of gravity of the actuator mechanism in the first x component of the first coordinate system comprises:
- obtaining a third VCM current ($I_{y+}$) when the actuator mechanism is oriented in a third orientation;
- obtaining a fourth VCM current ($I_{y-}$) when the actuator mechanism is oriented in a fourth orientation;
- calculating the first x component of the first coordinate system as a function of the third VCM current ($I_{y+}$) and the fourth VCM current ($I_{y-}$).

13. The method of claim 10, wherein calculating the center of gravity in the second x and y components of the second coordinate system comprises:
- calculating the angle ($\phi$) between the track accessing arm and the y-axis of the first coordinate system as a function of an angle ($\beta$) between the first y-axis and a line that extends from the pivot shaft to a central axis of a storage media and an angle ($\alpha$) between the second y-axis and the line that extends from the pivot shaft to the central axis of the storage media;
- calculating the second y component as a function of the first x component of the first coordinate system, the first y component of the first coordinate system and the angle ($\phi$); and
- calculating the second x component as a function of the first x component in the first coordinate system, the first y component in the first coordinate system and the angle ($\phi$).

14. The method of claim 10, wherein calculating the mass unbalance of the actuator mechanism comprises:
- multiplying the mass of the actuator mechanism with the square root of the sum of the second x component squared and the second y component squared.

15. An apparatus comprising:
- a voice coil motor configured to rotate the actuator mechanism about a pivot shaft, the actuator mechanism drawing a current from the voice coil motor; and
- means for determining the mass unbalance of the actuator mechanism as a function of first x ($C_{X1}$) and y ($C_{Y1}$) components in a first coordinate system and second x ($C_{X2}$) and y ($C_{Y2}$) components in a second coordinate system, wherein the first coordinate system intersects a pivot shaft of the actuator mechanism and has a y-axis in parallel with a longitudinal axis of the system and an x-axis normal to the y-axis and the second coordinate system intersects a pivot shaft of the actuator mechanism and has a y-axis in alignment with a longitudinal axis of a track accessing arm of the actuator mechanism and an x-axis normal to the y-axis.

16. The apparatus of claim 15, wherein the means for determining the mass unbalance of the actuator mechanism comprises:
- calculating a center of gravity of the actuator mechanism in first x ($C_{X1}$) and y ($C_{Y1}$) components of the first coordinate system;
- calculating the center of gravity of the actuator mechanism in second x ($C_{X2}$) and y ($C_{Y2}$) components of the second coordinate system; and
- calculating a total mass unbalance of the actuator mechanism as a function of the first x ($C_{X1}$) and y ($C_{Y1}$) components and the second x ($C_{X2}$) and y ($C_{Y2}$) components.

17. The apparatus of claim 16, wherein the means for determining the mass unbalance of the actuator mechanism comprises:
- multiplying the mass of the actuator mechanism with the square root of the sum of the second x component squared and the second y component squared.

* * * * *

UNITED STATES PATENT AND TRADEMARK OFFICE
CERTIFICATE OF CORRECTION

| | | |
|---|---|---|
| PATENT NO. | : 7,328,118 B2 | Page 1 of 1 |
| APPLICATION NO. | : 10/731806 | |
| DATED | : February 5, 2008 | |
| INVENTOR(S) | : Xiong Liu et al. | |

It is certified that error appears in the above-identified patent and that said Letters Patent is hereby corrected as shown below:

Column 5
Equation 4, after "pc2+pg2" insert -- - --.

Signed and Sealed this

Twentieth Day of May, 2008

JON W. DUDAS
*Director of the United States Patent and Trademark Office*